United States Patent

Wanamaker

[11] Patent Number: 5,812,728
[45] Date of Patent: Sep. 22, 1998

[54] TERMINUS ADAPTER FOR FIBER OPTIC CABLES

[75] Inventor: Michael F. Wanamaker, Garden Grove, Calif.

[73] Assignee: McDonnell Douglas Corporation, Huntington Beach, Calif.

[21] Appl. No.: 751,758

[22] Filed: Nov. 18, 1996

Related U.S. Application Data

[60] Provisional application No. 60/027,806 Oct. 4, 1996.
[51] Int. Cl.⁶ .................................................. G02B 6/36
[52] U.S. Cl. .......................................... 385/139; 385/76
[58] Field of Search .................................. 385/138, 139, 385/137, 136, 76, 77, 78, 80, 84, 85, 94

[56] References Cited

U.S. PATENT DOCUMENTS

| | | | |
|---|---|---|---|
| 4,707,068 | 11/1987 | Moulin | 385/72 |
| 4,759,601 | 7/1988 | Knutsen et al. | 385/138 |
| 4,822,130 | 4/1989 | Maranto et al. | 385/138 |
| 4,941,727 | 7/1990 | Maranto et al. | 385/81 |
| 5,107,536 | 4/1992 | Wall | 385/81 |
| 5,113,464 | 5/1992 | Wall | 385/81 |
| 5,113,475 | 5/1992 | Baker | 385/76 |
| 5,125,059 | 6/1992 | Wall | 385/81 |
| 5,341,447 | 8/1994 | Edwards et al. | 385/81 |
| 5,366,315 | 11/1994 | Hartley | 403/20 |
| 5,469,521 | 11/1995 | Coutts et al. | 385/77 |
| 5,588,086 | 12/1996 | Fan | 385/139 |
| 5,598,499 | 1/1997 | Burek et al. | 385/138 |

*Primary Examiner*—John Ngo
*Attorney, Agent, or Firm*—Bell Seltzer Intellectual Property Law Group of Alston & Bird LLP

[57] ABSTRACT

An adapter for securement to a terminus at an end of a fiber optic cable and which permits the terminus to be fitted within a connector with an effective environmental seal between the cable and the connector. The adapter is concentrically disposed about the fiber optic cable sheathing and engages the rearward end of the terminus. The adapter has an outer body with a forwardly projecting plug sized to fit within the open rearward end of the terminus. Thus, when the terminus is inserted into the connector, a tight environmental seal is maintained between the fiber optic cable and the connector.

12 Claims, 2 Drawing Sheets

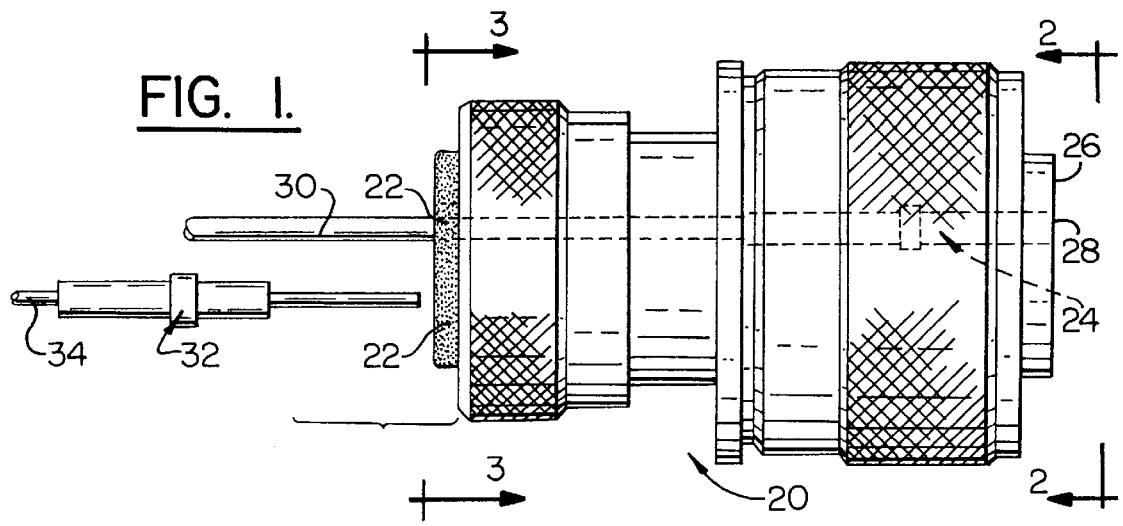
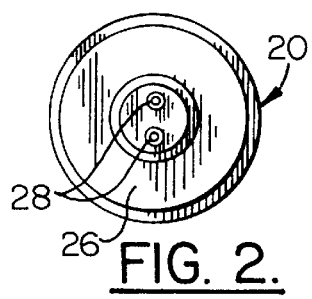
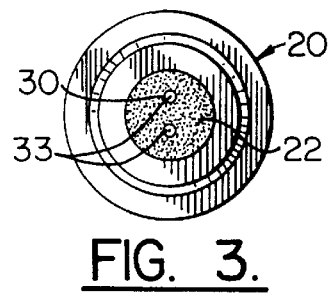
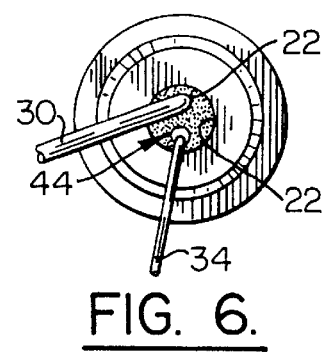
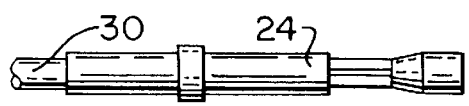
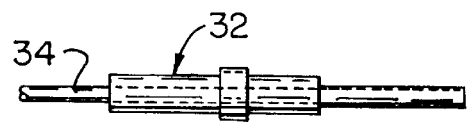
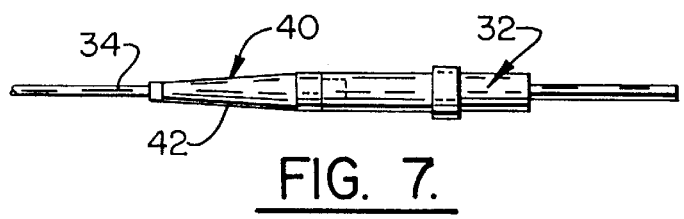

TERMINUS ADAPTER FOR FIBER OPTIC CABLES

BACKGROUND OF THE INVENTION

1. Field of the Invention

This invention relates in general to certain new and useful improvements in terminus adapters for fiber optic cables to enable fitting within a connector with an environmental seal therebetween.

2. Brief Description of Related Art

In recent years, fiber optic cables have replaced electrical cables as a means for information transmission, in a variety of applications. One of the problem areas frequently encountered in the art of fiber optic cables is the actual connection of the cable to a connector or with the connection of cables to one another in order to provide for a desired length and routing of the fiber optic path. There have been numerous advances in the art of connecting fiber optic cables, although none of these advances have effectively dealt with the provision of an environmental seal between a cable and terminus pin or terminus socket. This is particularly true where the cable may be of substantially smaller diametral size than other fiber optic cables connected to the same connector.

When terminating a relatively small diameter fiber optic cable within an optical terminus, such as a number 16 size terminus, the optical cable oftentimes is much smaller than the opening of the terminus. However, the cable must be permanently fastened within the terminus and this is usually accomplished by a curing process. However, the cable must be temporarily fastened to the terminus to prevent the cable from recessing with respect to the terminus during the curing process. Frequently, a high temperature tape is wrapped about the cable and the terminus to prevent this recessing.

Upon completion of the curing process for holding the cable within the terminus, the finished assembly can then be used for a connection to a multi-cavity connector. However, at this point, the integrity of the environmental seal is lost due to the fact that the optical fiber is much smaller than the opening of the terminus. As a result, moisture and foreign matters, such as dirt or the like, can migrate into the space between the cable and the opening of the terminus.

There have been a large number of advances made with respect to connection of fiber optic cables. Among those advances are those taught in U.S. Pat. No. 5,469,521 to Coutts, et al., which deals with the sealing of a buffer tube to a fiber optic cable. The cable is concentrically disposed within the buffer tube and is usually secured within the tube by means of an epoxy-type resin. In the Coutts reference, a shrink material is disposed around the fiber to preclude the epoxy from damaging the fiber optic cable during the shrinking process.

U.S. Pat. No. 4,941,727 to Maranto, et al., uses an epoxy for gluing a fiber optic cable within a terminus. Moreover, Maranto actually crimps the terminus about the fiber optic cable. Maranto prefers the crimping process because of the long cure time involved with an epoxy, and the limited shelf life of an epoxy resin. U.S. Pat. No. 5,107,536 to Wall, also discloses a crimping of the fiber optic cable within a terminus. The same holds true of U.S. Pat. No. 5,113,464 to Wall, and U.S. Pat. No. 5,125,059 to Wall.

There are several drawbacks to the crimping of a fiber optic cable within a terminus. Probably one of the most significant drawbacks is the fact that, during the crimping process, there is always a risk that one can nick the cable or otherwise literally crack the cable. Thus, there a significantly increased amount of waste when a crimping operation is employed.

U.S. Pat. No. 5,341,447 to Edwards, discloses the use of an insert for receiving and securing a fiber optic cable within a ferrule of a fiber optic connector. The insert has a deformable region which deforms upon compaction so that the optical cable is securely held by the insert. Here again, this technique also has a serious drawback in that there is a much greater tendency to crack the cable during the compacting process.

U.S. Pat. No. 5,366,315 to Hartley, discloses a process for installation of alignment sleeves and the removal of the sleeves for mounting a fiber optic cable in a socket terminus. U.S. Pat. No. 4,707,068 to Moulin, discloses a connector for stranded optical fiber conductors.

Heretofore, there has been no effective device to overcome the problem of terminating an optical cable within a terminus and maintaining the integrity of an environmental seal of the cable within a cavity of a multi-cavity connector.

OBJECTS OF THE INVENTION

It is, therefore, one of the primary objects of the present invention to provide an adapter for use with a fiber optic cable terminus which maintains a tight fitting seal around the terminus.

It is another object of the present invention to provide an adapter of the type stated for use with a fiber optic cable terminus and which maintains an effective environmental seal between the cable and the terminus.

It is a further object of the present invention to provide a fiber optic cable terminus adapter which precludes any cable recessing during a curing operation.

It is an additional object of the present invention to provide a fiber optic cable terminus which allows for a small diameter cable to be used with a terminus and connector which will nevertheless maintain a tight environmental seal in a multi-cavity connector.

It is still another object of the present invention to provide a contact adapter of the type stated which is highly effective in operation and can be made at a relatively low cost.

It is yet another objective of this invention to provide a means of securing in a small diameter fiber optic cable in a terminus during the curing process and which will eliminate the need for the high temperature tape.

With the above and other objects in view, my invention resides in the novel features of form, construction, arrangement and combination of parts presently described and pointed out in the claims.

SUMMARY OF THE INVENTION

The present invention relates in general to an adapter for use with an optical fiber terminus and which allows for an effective environmental seal between the terminus and an optical fiber. The adapter of the present invention is effective in that it allows for differing sized cables to be connected to a terminus with an effective environmental seal, regardless of the size of the cable within a specific range.

The adapter of the present invention comprises a body such as an outer cylindrically shaped body having an elongated optical fiber channel extending therethrough from one end to the other end thereof. The body has a first end which is sized to connect to an open end of the terminus in such manner that the fiber is held in the adapter with an effective environmental seal maintained between the fiber and the adapter and hence between the adapter and the terminus.

The body of the adapter also has a second end which is opposite to the first end. The second end of the body has a fiber receiving opening in communication with the channel such that a fiber can extend through the channel in the body of the adapter and into the bore of the terminus. In this way, the fiber is introduced to the head end of the terminus whereby the terminus can be connected into a multi-port connector.

In more detail, the adapter of the invention is provided with an insertion means such as a plug at its first end for connection to the terminus. The plug is of a reduced diameter with respect to the overall body of the adapter and extends into an open rearward end of the terminus. In this way, the plug will generally snugly fit within the rearward opening at the end of the terminus.

A shoulder is also formed on the body of the adapter and surrounds the plug on the adapter. This shoulder is sized to abut against an end of the terminus when the plug is extended into the terminus. In this way, a relatively tight environmental seal is maintained at least between the terminus and the adapter. The seal further has an opening in communication with the opening on the body.

The seal may be in the form of a grommet which is secured to the rearwardmost end of the adapter itself. The seal is somewhat T-shaped, and has a circular protrusion extending into the elongated channel of the body.

The present invention also relates to an improved terminus assembly for securement of an optical fiber in the terminus of that terminus assembly and with an environmental seal against ambient conditions. In this case, the environmental seal precludes any moisture or dirt or other foreign matter in the ambient environment from entering into the region of the fiber in the rearward end of the terminus.

The terminus has an outer wall and an interior central bore with the latter sized to receive an optical fiber from the rearward end thereof. The terminus is sized and shaped to extend into a multi-cavity connector of the type which may be of conventional construction.

The adapter has its first end secured to the rearward end of the terminus and is also provided with the aforesaid optical fiber channel extending therethrough and which is also in communication with the bore of the terminus.

The adapter is also provided with the plug at the second end thereof to extend into the open end of the terminus in such manner that a relatively tight engagement exists between the adapter and the fiber. Thus, and with this construction, a relatively tight engagement also exists between the adapter and the terminus such that there is an effective environmental seal surrounding the end of the fiber.

The present invention thereby provides a unique and novel adapter for use with a terminus and which enables the creation of an effective environmental seal between the adapter and a fiber optic cable and which thereby fulfills all of the objects and advantages which have been sought. It should be understood that the present invention satisfies other problems which will become more fully apparent from a consideration of the forms in which the adapter and the adapter assembly of the invention may be embodied. One of these forms is more fully illustrated in the accompanying drawings and described in the following detailed description of the invention. However, it should be understood that the accompanying drawings and the detailed description are set forth only for purposes of illustrating the general principles of the invention and are not to be taken in a limiting sense.

BRIEF DESCRIPTION OF THE DRAWINGS

Figure 8:
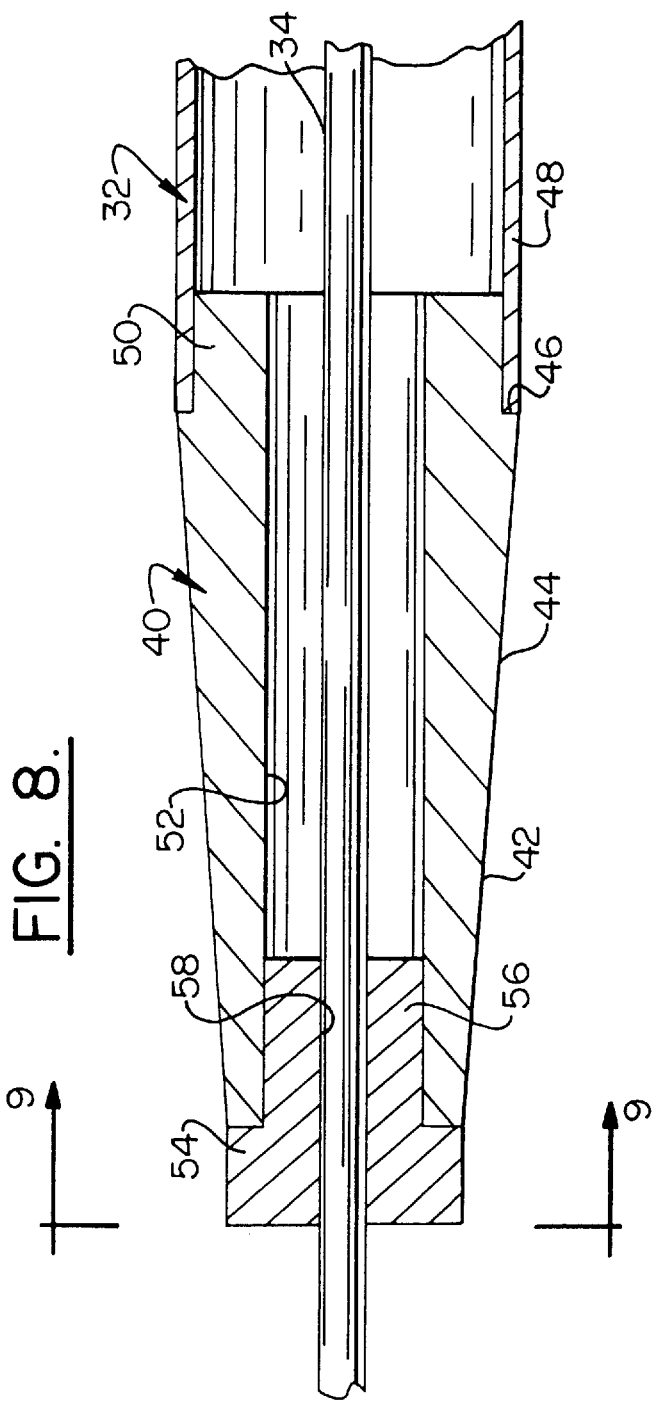
Figure 9:
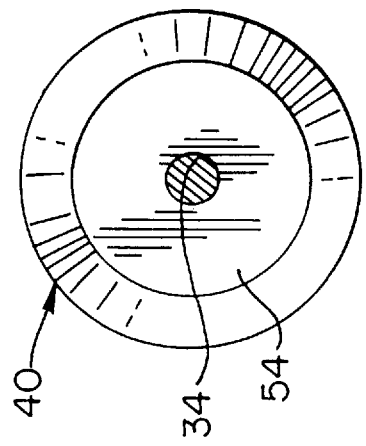

Having thus described the invention in general terms, reference will now be made to the accompanying drawings (two sheets) in which:

FIG. 1 is a side elevational view showing the attachment of a terminus connected to a fiber optic cable and a multi-port connector;

FIG. 2 is an end elevational view taken along the plane of line 2—2 of FIG. 1;

FIG. 3 is an end elevational view taken along the plane of line 3—3 of FIG. 1;

FIG. 4 is an enlarged side elevational view of a terminus socket fitted within the connector and having a fiber optic cable connected thereto;

FIG. 5 is an enlarged side elevational view of a terminus pin having a reduced sized fiber optic cable connected thereto;

FIG. 6 is an end elevational view showing the connection of a regular sized fiber optic cable and a reduced diameter fiber optic cable connected to a multi-port connector;

FIG. 7 is an enlarged side elevational view showing the adapter of the present invention connected to a terminus and with a fiber optic cable connected thereto;

FIG. 8 is an enlarged sectional view showing the attachment of an adapter to a rearward end of a terminus in accordance with the present invention; and FIG. 9 is an end elevational view of the adapter taken along the plane of line 9—9 of FIG. 8.

DETAILED DESCRIPTION

Referring now in more detail and by reference characters to the drawings which illustrate a preferred embodiment of the present invention, 20 designates a side elevation view of a multi-port connector which in and of itself is of generally conventional construction.

The connector typically includes a port 22 at its rearward end, that is, the left-hand end with reference being made to FIG. 1, adapted to receive either a terminus socket or a terminus pin, either of which are typically referred to in the art as a "terminus".

The connector of the present invention is a multi-port connector such that there are a number of ports 22 at the rearward end. A terminus socket 24 extends through the connector 20 to the forward end 26 of the connector 22 and terminates in an opening in the manner as shown in FIG. 2, such that another terminus not shown at the forward end 26 the connector 20 would be able to communicate with the light in a fiber optic cable. The actual construction of the connector 20 is neither illustrated nor described in any further detail herein inasmuch as the connector 20 is conventional.

As indicated previously, a terminus, such as the terminus socket 24, is inserted through one of the ports or openings 22 at the rearward end of the connector 20. In this case, the socket 24 is similarly of conventional construction and is provided with a fiber optic cable 30 connected thereto. In the arrangement as shown in FIGS. 1–4, the fiber optic cable 30 is a 2.1 millimeter diameter cable. Moreover, the cable is secured to the rearward end of the terminus socket 24 by any conventional means, such as by crimping or by means of an epoxy curing, or the like.

FIG. 1 illustrates a terminus pin 32 which is provided for connection to the connector 20 at another one of the openings 28. In this case, the terminus pin 32 would be essentially of the same diameter as the terminus socket 26 but would be provided for potential insertion into another connector opening 33 similar to the opening 22. In the arrangement as shown in FIG. 1, the terminus pin 32 has connected to its rearward end a fiber optic cable 34 which is of reduced diameter with respect to the fiber optic cable 30. In this case, the fiber optic cable 34 may be e.g. a 0.9 millimeter diameter cable. Consequently, the cable 34 is of significantly smaller diameter than the rearward end of the terminus 32. As a result, it is difficult to obtain a tight environmental seal between the cable 34 and the terminus 32. This arrangement is more fully illustrated in FIG. 5 of the drawings.

It can be seen in FIG. 4 that the cable 30 has a diameter almost approximately equal to but slightly less than the diameter of the rearward end of the terminus socket 24. However, in the arrangement as shown in FIG. 5, the cable 34 has a diameter significantly smaller than the rearward end of the terminus pin 32. This creates the undesirable situation that moisture and foreign matter can collect in the rearwardly presented opening of the terminus pin 32 in the region where the stripped end of the fiber cable 34 is inserted into the terminus 32.

FIGS. 7–9 illustrate the unique adapter 40 which fits at the rearward end of any of the terminus, as for example, the terminus 32, and in this case is designed to receive the fiber optic cable 34. The actual details of construction of the adapter 40 are more fully illustrated in FIGS. 8 and 9 of the drawings. However, in accordance with FIG. 7, it can be seen that the adapter 40 is tightly fitted to the rearward end of the terminus pin 32 and that the fiber optic cable 34 extends through the adapter 40 and into the terminus pin 32.

The adapter 40 is comprised of an outer body 42 having an inwardly tapering, rearwardly extending exterior wall 44. At its forward end, reference being made to FIG. 8, the adapter is provided with a cylindrically shaped shoulder 46 which is designed to abut against the rearward end of the terminus pin 32. By reference to FIG. 8, it can be seen that the rearward end of the terminus pin or terminus contact is provided with a skirt 48. The adapter 40 is also provided with a forwardly extending plug or protrusion 50 which tightly fits within the bore of the skirt 48, in the manner as best shown in FIG. 8 of the drawings. As the protrusion or plug 50 fits within the bore of the skirt 48, the shoulder 46 will abut against the rearwardly projecting annular edge of the skirt 48, as also shown in FIG. 8.

The body 42 also is provided with an elongated central opening or bore 52 for receiving a fiber optic cable. It can be seen that this opening extends through the shoulder 46 and the plug 50 as well and into the bore of the terminus pin 32. This opening 52 is sized to receive a conventional fiber optic cable or fiber as, for example, a 0.9 millimeter diameter fiber.

A grommet 54 is either secured to or otherwise integral with the rearward end of the body 42 and includes a plug section 56 extending into the channel 52, also in the manner as best shown in FIG. 8. In this way, the grommet 54 is held at the rearward end of the body 42. Moreover, the grommet 54 along with the plug 56 are provided with a central opening 58 which communicates with the channel 52 and hence with the bore of the terminus pin 32. It can also be seen that the opening 58 is diametrally smaller than the channel 52. As a result, the opening 58 is sized to receive a smaller diameter cable, as, for example, a 0.9 millimeter cable such as the cable 34.

In the event that the grommet 54 is not integral with the body 42, it may be removable from the body 42 by merely pulling the plug 56 from the rearward end of the channel 52. In this latter construction, the plug 56 frictionally would fit within the channel 52. In this way, a plug having a slightly larger or smaller opening 58 could be used to accommodate a differing sized optical fiber.

The body of the adapter 40 and for that matter the other components forming part of or associated with the adapter 40 as heretofore described, could all be formed of a suitable plastic material such as polyethylene, polypropylene or the like. However, if desired, the adapter could be formed of a metal.

The optical cable such as the optical fiber is inserted through the opening in the seal 58 prior to termination thereof. After the cable is stripped to its proper dimensions, the cable can then be inserted into the terminus contact such as the terminus pin 32. The adapter 40 is then inserted into the rearward end of the terminus pin until the shoulder 46 abuts against the rearwardly presented annular face of the skirt 48. This arrangement will then hold the cable tightly in place during an epoxy curing process. In this way, the cable can be fixedly held within the terminus pin by an epoxy or similar resin when cured.

Upon completion of the termination process, the completed terminus pin can then be inserted with the adapter into a multi-cavity circular connector, such as the connector 20. The adapter will ensure the integrity of the connector's environmental seal and ensure that that seal will be maintained.

Thus, there has been illustrated and described a unique and novel adapter for use with a terminus and also an assembly of a terminus and an adapter which maintains a tight environmental seal between the terminus and a fiber optic cable. Thus, the present invention fulfills all of the objects and advantages which have been sought therefor. It should be understood that many changes, modifications, variations and other uses and applications will become apparent to those skilled in the art after considering this specification and the accompanying drawings. Therefore, any and all such changes, modifications, variations and other uses and applications which do not depart from the spirit and scope of the invention are deemed to be covered by the invention.

Having thus described my invention, what I desire to claim and secure by Letters Patent is:

1. An adapter for use with an optical fiber terminus and which allows for an effective environmental seal between a terminus and an optical fiber, said adapter comprising:

an adapter body having first and second ends and an elongated optical fiber channel extending through said adapter body, wherein said elongated optical fiber channel is sized to receive optical fibers having a variety of sizes, and wherein said first end of said adapter body is operably connected to a rearward end of said terminus; and a plug, at least partially disposed within said second end of said adapter body, for forming an environmental seal with said adapter body, wherein said plug defines an aperture sized to snugly receive an optical fiber having a predetermined diameter such that an environmental seal is thereby also created between said plug and said optical fiber such that an overall environmental seal is maintained between the optical fiber and said terminus.

2. The adapter for use with an optical fiber terminus of claim 1 wherein said first end of said adapter body further comprises an insertion means for operably connecting to said rearward end of said terminus.

3. The adapter for use with an optical fiber terminus of claim 2 wherein said insertion means comprises a cylindrical protrusion for extending into the rearward end of said terminus.

4. The adapter for use with an optical fiber terminus of claim 3 wherein said cylindrical protrusion is sized to fit snugly within said rearward end of said terminus.

5. The adapter for use with an optical fiber terminus of claim 4 wherein said adapter body further comprises a shoulder adjacent said cylindrical protrusion and sized to abut against said terminus when the cylindrical protrusion is extended into the rearward end of said terminus.

6. The adapter for use with an optical fiber terminus of claim 1 wherein said plug has a first end disposed in said second end of said adapter body, and wherein the plug has a second end, opposite the first end, that is larger than said first end and which surrounds the second end of said adapter body.

7. The adapter for use with an optical fiber terminus of claim 6 wherein said plug is T-shaped in cross-section, and wherein the first end of said plug has a cylindrical protrusion extending into said elongated optical fiber channel.

8. The adapter for use with an optical fiber terminus of claim 1 wherein said plug is T-shaped in cross-section, and wherein the first end of said plug has a cylindrical protrusion extending into said elongated optical fiber channel.

9. An improved terminus assembly for the securement of an optical fiber with an environmental seal against ambient conditions, said terminus assembly comprising:

a terminus having an outer wall and an interior central bore opening through a rearward end of said terminus to receive an optical fiber and which terminus is sized and shaped to extend into a multi-cavity connector;

an adapter body having opposed forward and rearward ends and defining an elongated optical fiber channel extending therethrough which is adapted to receive optical fibers having a variety of sizes, wherein the forward end is sized to be snugly received within the interior central bore opening through the rearward end of said optical fiber terminus to thereby create an environmental seal between said elongated forward end of said adapter body and said rearward end of said optical fiber terminus; and a plug operably connected to said rearward end of said adapter body, wherein said plug defines an aperture sized to snugly receive an optical fiber having a predetermined diameter to thereby also create an environmental seal between said plug and said optical fiber such that an overall environmental seal is maintained between the optical fiber and said optical fiber terminus.

10. The improved terminus assembly of claim 9 wherein said forward end of said adapter body has a reduced diameter relative to other portions of said adapter such that said forward end is sized to generally fit snugly within said rearward end of said optical fiber terminus.

11. The improved terminus assembly of claim 10 wherein said adapter body further comprises a shoulder adjacent said reduced diameter forward end that is sized to abut against said optical fiber terminus when the forward end of said adapter body is extended into the rearward end of said optical fiber terminus.

12. The adapter for use with an optical fiber terminus of claim 9 wherein said plug is disposed in said rearward end of said adapter body and at least partially extends into the elongated optical fiber channel of the adapter body such that said plug forms an environmental seal with said adapter body.

* * * * *